United States Patent [19]
Woodruff

[11] Patent Number: 6,003,266
[45] Date of Patent: Dec. 21, 1999

[54] TERMITICIDE BAIT TUBE FOR IN GROUND APPLICATION

[75] Inventor: Keith F. Woodruff, Mountainside, N.J.

[73] Assignee: American Cyanamid Company, Madison, N.J.

[21] Appl. No.: 08/480,579

[22] Filed: Jun. 7, 1995

[51] Int. Cl.[6] .............................. A01M 1/00; A01M 1/20
[52] U.S. Cl. ................................. 43/124; 43/131
[58] Field of Search ................................ 43/124, 131, 58, 43/132.1; 239/276, 57, 58, 59; 47/48.5 G, 48.5

[56] References Cited

U.S. PATENT DOCUMENTS 5,555,672  9/1996  Thorne et al. .

OTHER PUBLICATIONS

Patent Abstracts of Japan, Publication No. JP1319401, Published Dec. 25, 1989.
Pest Control Technology, dated Jul., 1994, pp. 54–56, 60, 125.
Pest Control, dated Jun., 1994, pp. 36–38.

*Primary Examiner*—Jack W. Lavinder
*Attorney, Agent, or Firm*—Mark P. Stone

[57] ABSTRACT

An in ground termiticide/bait tube for insect detection and control includes a first outer housing tube fixedly implanted into the ground and a second inner tube removably receivable within the housing. The inner tube contains bait for detecting and controlling termite activity, and can be inspected or replaced by removing the inner tube from the outer tube. The inner tube is mounted within the outer tube by rotation along a lead thread such that maximum relative rotation assures alignment of openings in the inner and outer tubes. The device further includes a flexible cap to provide tampering resistance when the inner and outer tubes are installed below ground, a metering cup removably received in the inner tube, and lugs on the metering cup to provide rotational movement of the metering cup and the inner tube relative to fixed outer tube.

16 Claims, 4 Drawing Sheets

TERMITICIDE BAIT TUBE FOR IN GROUND APPLICATION

BACKGROUND OF THE INVENTION

The present invention is directed to methods and apparatus for detecting and controlling termite activity by bait containing devices implanted in ground.

U.S. Pat. No. 5,329,726 discloses a system for termite detection and control including embodiments of the invention in which a bait cartridge is removably received within a housing implanted into the ground. A non-toxic bait material is provided within the cartridge for periodic removal from the housing for inspection for termite activity. If termite activity is present, the original bait material is replaced with a toxicant for controlling the termite activity. Openings in the permanently implanted housing permit access by the termites to the material within the housing, and maintain passageways established in the ground by the termites in alignment with the openings in the housing to assure that the termites will be guided to the openings. The disclosure of U.S. Pat. No. 5,329,726 is expressly incorporated by reference herein.

It is an object of the present invention to provide improved in ground devices for monitoring and controlling termite activity including an apertured outer housing permanently implanted in ground, and a bait-containing inner housing removably received within the outer housing and threadably coupled thereto for monitoring and controlling termite activity, and assuring that openings in the inner and outer housings will maintain alignment.

It is a further object of the present invention to provide a device of the aforementioned type including a removable, flexible cover for providing resistance to tampering of the device when installed in ground, and for providing child and pet safety.

Further objects of the invention are to provide improved means for fixedly implanting the outer housing in ground, and to provide improved means for rotating the inner housing relative to the fixed outer housing.

Other objects, features, and advantages of the present invention will become apparent from the following discussion.

SUMMARY OF THE INVENTION

A device for monitoring and controlling termite activity includes a first outer housing adapted to be permanently implanted in ground. The outer housing is of a generally tubular shape, and defines at least one opening in the outer surface thereof for permitting access by termites therein. At least one projection extends radially outwardly from the outer surface of the outer housing to prevent the outer housing from rotating after it is implanted in ground. An inner housing defining at least one opening comprises a bait tube generally conforming to the configuration of the outer housing and is removably received within the outer housing. The inner and outer tubes are removably coupled together by threading, and are operatively arranged relatively to each other such that maximum rotation of the inner tube relative to the outer tube in a predetermined direction assures that the openings defined in the outer tube are aligned with the openings defined in the inner tube. In this manner, the inner tube is securely received within the outer tube when the device is in its operative position, and alignment of the openings in the inner and outer tubes upon removal and replacement of the inner tube, is automatically achieved by rotating the inner tube a maximum angular distance relative to the outer tube.

In further aspects of the invention, the bottom end of the outer tube is pointed to facilitate driving thereof into the ground, openings are provided in the inner and outer tubes to permit drainage of excess water that might otherwise accumulate in the bait material within the inner housing, and the clearance between the outer surface of the inner tube and the inner surface of the outer tube is reduced by bosses provided around the openings defined in the inner tube to provide a continuous passageway between corresponding aligned openings in the respective tubes. A metering cup for providing water to be mixed with the bait material within the inner housing is removably mounted atop the inner housing by friction fit engagement. Splines or lugs provided around the periphery of the metering cup are received within complementary recesses defined in the inner tube to releasably mate the metering cup and the inner tube. Accordingly, rotation of the metering cup results in rotation of the inner housing relative to the outer housing for removal and replacement of the inner housing.

In a still further aspect of the present invention, the device includes a flexible cover having a center portion removably mounted to the top of the metering cup to prevent access to the metering cup and the inner tube. The cover includes a peripheral portion received in a recess defined in a flange extending radially outwardly from the upper portion of the outer housing. The center portion of the cover can be flexed to disengage the peripheral portion of the cover from the flange to provide access by a tool to the splines or lugs on the metering cup below the cover for rotation of the metering cup for removing the inner housing from the fixed outer housing.

The flange extending outwardly from the upper portion of the outer housing includes a plurality of radially spaced ribs defining openings therebetween to permit sand, soil, or other filler material to fill the clearance between the outer surface of the outer housing and the ground after the outer housing is implanted in ground to provide continuous terrain adjacent to the outer housing to permit the burrowing of passageways by termites leading to the openings defined in the outer housing.

The termite detection and control device in accordance with the present invention enables quick and efficient removal and re-installation of a bait-containing inner tube from and into an outer tube fixedly implanted in ground, assuring that respective openings in the inner and outer tube will automatically be maintained in alignment.

DESCRIPTION OF THE BEST MODES FOR CARRYING OUT THE INVENTION

Figures 1, 3:
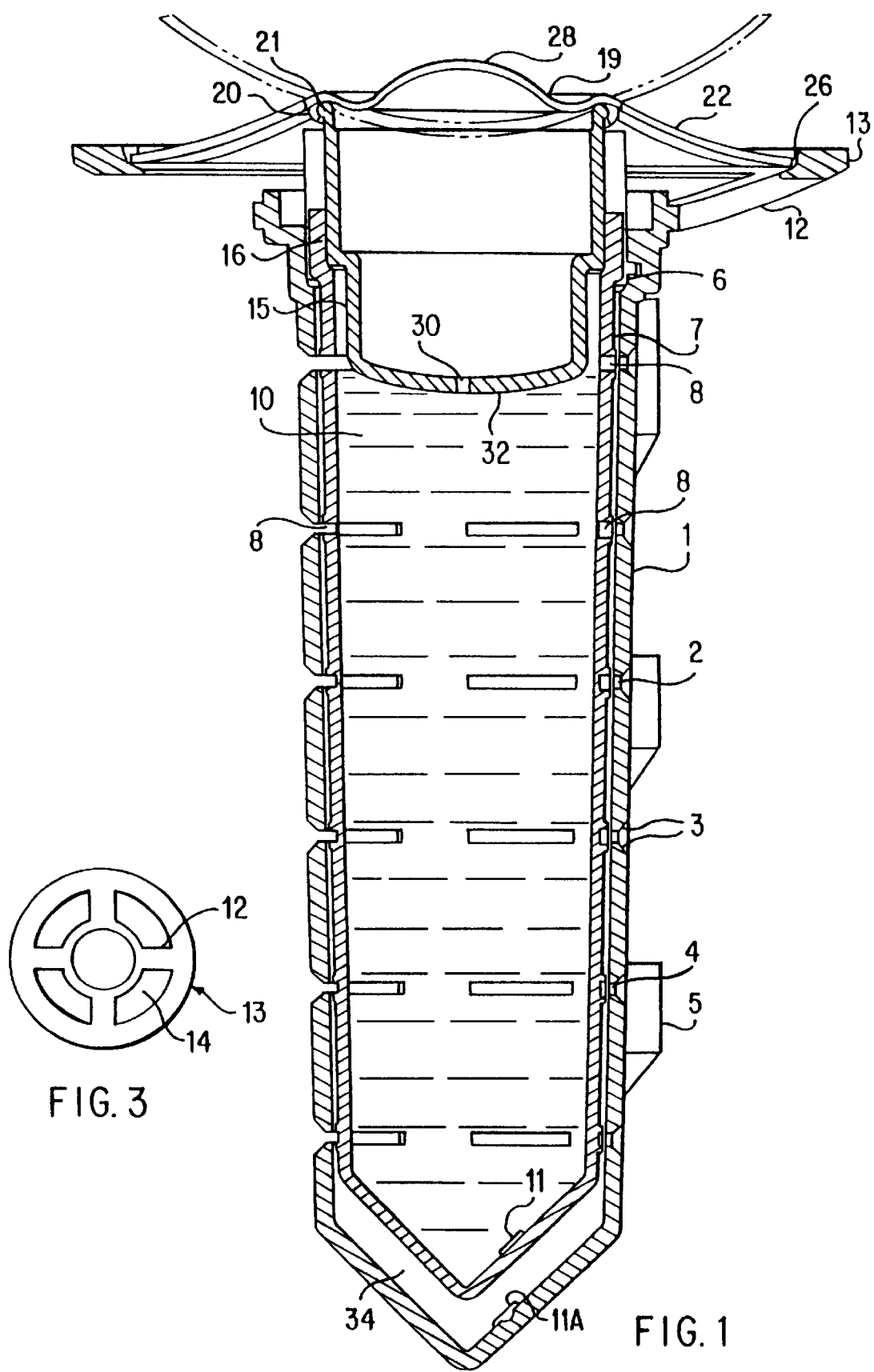
FIG. 1 of the drawing illustrates a sectional view of a device for monitoring and controlling termites in accordance with the present invention including an inner tube received within an outer tube, a metering cup inserted into the top of the inner tube, and a cover mounted above the metering tube and inner and outer tube.
FIG. 3 of the drawing is a top plan view of a peripheral flange extending around the top portion of the outer tube.
Figure 2:
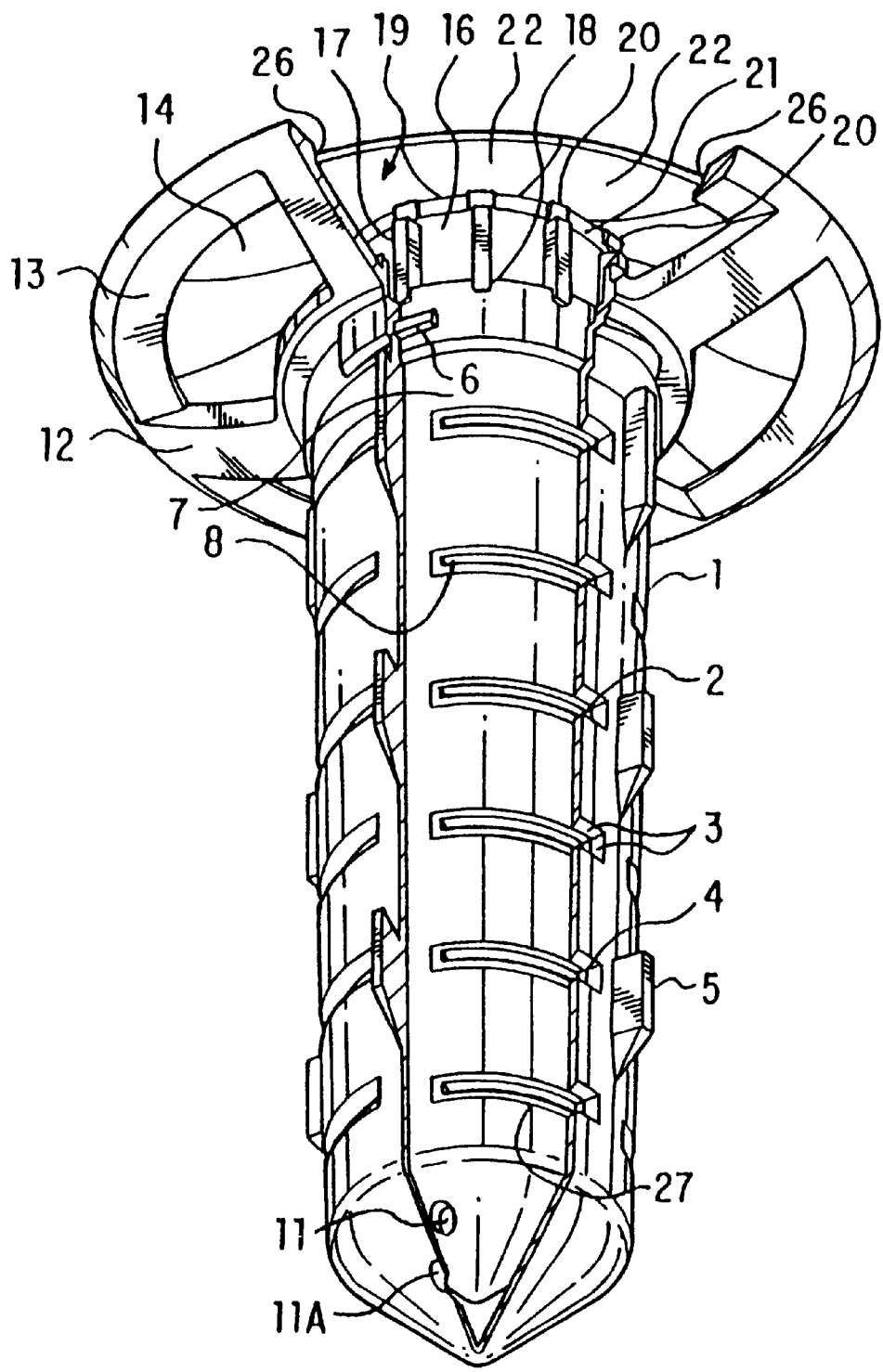
FIG. 2 of the drawing illustrates the device of FIG. 1, in perspective, further illustrating a section of the outer tube cut away to expose a corresponding section of the inner tube.

The device for monitoring and controlling in ground termite activity in accordance with the present invention will now be discussed with reference to FIGS. 1–6B of the drawing. Referring first to FIGS. 1 and 2, an outer tubular housing is designated by the reference numeral 1 and an inner tubular housing is designated by the reference numeral 7. As illustrated in FIGS. 1 and 2, the inner tube is removably received within the outer tube by a single lead thread designated by reference numeral 6. When the inner tube is rotated a maximum angular distance in a predetermined direction relative to the outer tube along the thread 6 on the inner tube, the device is in its operative position as shown in FIGS. 1 and 2 in which a plurality of entrance slots 2 having beveled guide edges 3 defined on the outer tube are in alignment with corresponding slots 8 defined in the inner tube 7 to define a narrow passageway designated by reference numeral 4 for guiding termites through the inner and outer tubes and into bait material 10 within the inner tube 7. The dimensions of the corresponding slots 2 and 8 defined on the outer and inner tubes are selected to permit termites to enter the inner tube and feed on the bait, but to exclude larger insects and animals from access to the bait material. The inner tube may be selectively removed from the outer tube by rotating the inner tube 7 along the single lead thread 6 defined thereon in the opposed predetermined direction until the inner tube disengages from the outer tube and may be lifted upwardly to be removed therefrom for inspection of termite activity in the bait material, and replenishment or replacement of the bait material. When the inner tube is reinstalled within the outer tube by relative rotation thereof a maximum angular distance in the proper predetermined direction, the respective slot 8 and 2 automatically realign to again define the continuous passageways 4 for providing access through the inner and outer tubes 7 and 1, respectively.

In operation of the device in accordance with the present invention, the outer tubular housing 1 is permanently and fixedly implanted in ground. The pointed forward end of the outer tube facilitates the driving of the outer tube into the ground. As illustrated by FIGS. 1 and 2, a plurality of outwardly extending elements comprising generally wedge shaped protuberances 5 are mounted to the outer surface of the outer tubular housing 1 between columns of slots 2 also defined in the outer surface of the outer housing 1. Preferably, as illustrated in FIG. 2, the elements 5 extend outwardly in a radial orientation and are arranged along the outer surface of the outer tube in vertical columns which are spaced between the vertical columns of openings 2 also defined in the outer surface of the outer tubular housing 1. The radially extending wedge shaped elements 5 are provided to prevent rotation of the outer tubular housing 1 once it is implanted into the ground, and in particular, to deter rotation of the outer housing when the inner housing is rotated relative to the outer housing along the lead thread 6 for removing or for reinstalling the inner tubular housing 7 from and into the fixedly implanted outer tubular housing 1. As also illustrated in FIG. 2, the inner housing 7 defines a drainage opening 11 proximate to the lower end thereof and the outer tubular housing 1 defines a drainage opening 11A proximate to the lower end thereof and also proximate to the drainage opening 11 in the inner housing. In this manner, excess moisture accumulating within the inner bait housing 7 will be discharged from the device and will not accumulate therein.

Figure 4:
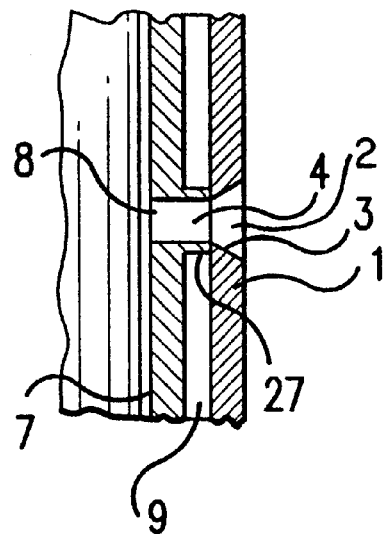
FIG. 4 of the drawing illustrates, in detail, a section of the inner tube abutting against the outer tube to align corresponding openings in the respective tubes.

FIG. 4 illustrates the detailed construction of the aligned openings 2 and 8 defined on the outer and inner tubes 1 and 7, respectively, to define one of the passageways 4 for providing access through the inner and outer tubes and into the inner bait tube. A boss 27, which is also illustrated in FIG. 2, is provided around the generally rectangular periphery of a slot 8 defined in the outer surface of the inner housing. The boss 27 abuts against the inner surface of the outer housing 1 to define a continuous passageway 4. As a result of the provision of the outwardly extending boss 27 around the slots 8 in the inner housing, a gap or space 9 is defined between the outer surface of the inner housing and the inner surface of the outer housing. The space 9 further insulates and protects the bait material within the inner tubular housing 7 from the ground and environmental conditions outside of the outer tubular housing 1.

Referring back to FIGS. 1 and 2, a ring or flange 13 is provided around the upper portion of outer housing 1. FIG. 3 illustrates a top plan view of the radially extending flange 13 which includes a plurality of radially oriented spoke segments 12 defining openings 14 therebetween. The openings 14 permit the introduction of dirt or sand to fill any gap between the outer surface of the outer housing 1 and the ground in which the device is implanted after the outer housing 1 is initially driven into the ground. The periphery of the flange 13 defines a recess 26, which, as will be discussed below, is provided to receive the edge of a removable flexible cover for the assembled implanted device.

Figure 5:
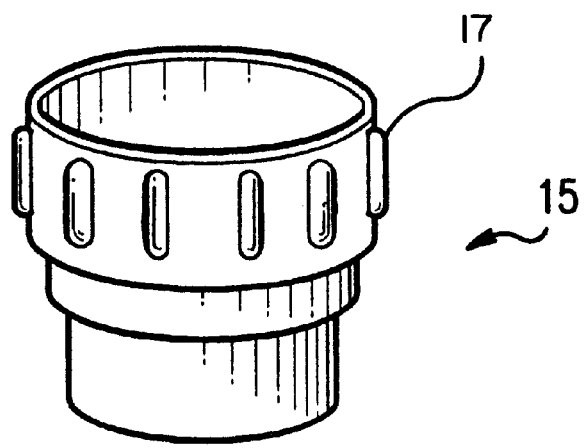
FIG. 5 of the drawing illustrates a perspective view of the metering cup received within the top of the inner tube as illustrated in FIGS. 1 and 2.

FIG. 5 illustrates a metering cup, generally designated by reference numeral 15, which is removably received in a friction fitting engagement in the opened top of the inner bait tube 7, as illustrated by FIGS. 1 and 2. The metering cup 15 defines a centrally disposed opening 30 in a bottom surface 32 thereof for allowing water to drip downwardly onto bait material 10 within the inner bait tube 7. Reference numeral 16 in FIGS. 1 and 2 generally illustrates the area in which the metering cup is removably friction fitted into the upper portion of the inner bait tube. As more clearly illustrated by FIG. 2, splines or lugs 17 extend outwardly from the periphery of the upper surface of the metering cup, and the lower portions of the splines are received in complementary recesses 18 defined in the upper portion of the inner bait tube 7 to permit the metering cup to securely nest within the inner bait tube in its removable friction fit engagement therewith. As a result of the removably locking engagement between the splines on the metering cup and the recesses in the bait tube, rotation of the metering cup relative to the outer tubular housing 1 also correspondingly causes rotation of the inner bait tube 7 relative to the outer tubular housing 1. Accordingly, rotation of the splines on the metering cup enables the removal or reinstallation of the inner tube from or into the outer tube for inspection and replacement of the bait material within the inner tube.

When the device is assembled as illustrated by FIGS. 1 and 2, the metering cup 15 is positioned above the bait material 10 within the inner bait housing 7. The opening 30 defined in the bottom surface 32 of the metering cup permits the appropriate quantity of water to drip from the metering cup downwardly onto the bait material 10 to actuate the bait material. As discussed above, drainage openings 11 and 11A defined in the bottom of the inner and outer housings 7 and 1 prevent excess water from accumulating within the device.

Preferably, prior to actuation of the bait material by water dripping downwardly from the metering cup, the inner wall of the inner bait tube 7 is lined with dissolvable paper for temporarily sealing the slot 8 in the inner bait tube to prevent the bait material 10 from escaping through the slots during transporting, loading or implanting the device in ground. The release of water from the metering cup to moisten and actuate the bait material will also dissolve the paper covering the slots 8 to open the slots and permit access by termites to the bait material.

Figure 6A:
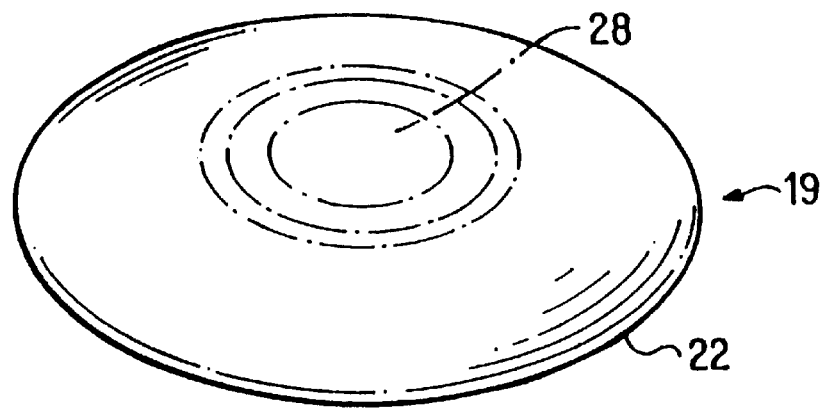
FIGS. 6A and 6B of the drawing illustrates in perspective, the top and bottom surfaces, respectively, of the flexible cover mounted atop the device as illustrated in FIGS. 1 and 2.
Figure 6B:
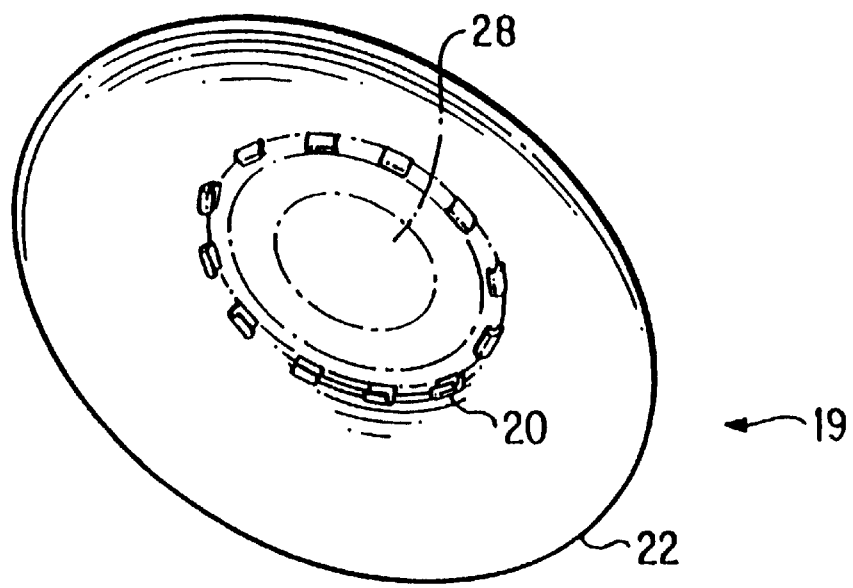

FIGS. 6A and 6B illustrates respectively, the top and lower surfaces of a flexible cover 19 mounted to the top of the assembled device as illustrated by FIGS. 1 and 2. The cover includes a centrally disposed portion 28, and a radially extending peripheral rim portion 22. A plurality of clip elements 20 are disposed around the outer surface of the central portion 28 of the cover 19. As illustrated most clearly by FIG. 2, the clips 20 engage a peripheral rim 21 of the metering cup 15 for releasably securing the central portion 28 of the cover 19 to the top of the metering cup 15. As also illustrated by FIGS. 1 and 2, the outer edge portion of the rim 22 of the flexible cover 19 is engaged and retained in a recess 26 defined by the flange 13 extending outwardly around the top portion of the outer tubular housing 1. When the flexible cap 19 is mounted atop the assembled device as illustrated by FIG. 1 and 2, the central portion 28 of the cover 19 closes the opened top of the metering cup 15, and the peripheral portion 22 of the flexible cover 19 covers the top of the outer tubular housing 1 including the opened areas 14 defined between the radially extending ribs 12 of the flange 13.

In its assembled, operational in ground state, the central portion of the flexible cover 19 is flexed upwardly to define a dome-shaped configuration as illustrated by FIG. 1. When the device is to be disassembled and the inner tube is to be removed from the outer tube, the central portion of the cover 19 is depressed downwardly, causing the peripheral rim portion 22 of the cover to extend upwardly, as illustrated in phantom in FIG. 1. By raising the rim portion 22, access is provided to the lugs 17 of the metering cup, which, as discussed above, enables rotation of the metering cup and the attached inner bait housing for removing the inner housing from the outer housing.

The cover 19 may be formed from any conventional resilient material to permit it to flex between its opened and closed positions as illustrated by FIG. 1. The arrangement by which the holding clips or locking elements 20 extend downwardly from the lower surface of the cover and snap over the rim 21 of the metering cup, and the arrangement by which the peripheral edge of the outer flange portion 22 of the cover is removably received within the recess 26 defined in the flange 13 extending radially from the outer tubular housing 1, enables the cover to rotate relative to the metering cup and the outer housing, without inadvertently disengaging therefrom. As discussed, removal of the cover requires the application of a downward force to the central portion 28, and therefore rotational movement by itself will not disengage the cover.

In operation of the device illustrated by FIGS. 1–6, the outer tubular housing 1 is driven in ground at a pre-selected location. The pointed forward end of the outer housing facilitates the implantation thereof into the terrain to be monitored. The housing is driven to a depth such that the radially extending flange 13 is substantially at ground level. The inner bait tube 7, which has been pre-loaded with bait material in the manner discussed above, is received within the implanted outer housing, and is removably secured thereto by rotation of the inner housing relative to the outer housing in a predetermined direction along the thread 6. As discussed above, the inner bait tube is rotated relative to the outer housing by inserting the metering cup 15 into the opened top end of the inner tube such that the lugs 17 extending downwardly from the periphery of the metering cup engage complementary recesses 18 defined in the upper sidewall portion of the inner bait tube. In this manner, rotation of the metering cup by engaging the lugs 17 also results in rotation of the inner bait tube relative to the outer housing. The outer housing remains fixedly implanted in the ground and does not rotate as a result of the anti-rotation elements 5 extending outwardly from the outer housing in a radial direction. Additional soil may be deposited through open areas 14 of the upper flange 13 for closing any gap or space between the outer surface of the outer tube and the surrounding terrain. In this manner, the slot or openings 2 defined in the outer surface of the outer housing abut against the surrounding terrain to enable termites to forage directly through the terrain and into the slots 2.

After the inner and outer tubes and the metering cups have been implanted into the ground, the center portion of the flexible cover 19 is snapped over the rim of the metering cup and the peripheral edge of the cover is received within the recess defined in the flange 13 extending radially outwardly from the upper portion of the outer housing. Water in the metering cup 15 is now permitted to drip downwardly onto the bait material 10 in quantities controlled by the opening 30 defined in the bottom -surface 32 of the metering cup. The bait material 10 is activated by mixing with the downwardly dripping water. Any excess accumulation of water in the inner housing 7 is drained through discharge opening 11 into the space 34 defined between the inner housing 7 and the outer housing 1. Water within the space 34 is subsequently drained into the surrounding terrain through discharge opening 11A. Accordingly, accumulation of excess water within the assembled device is controlled through the respective drainage openings 11 and 11A defined on the inner and outer housings.

When it is desired to remove the inner tube from the outer tube for inspection, replacement, or general maintenance, the procedure described above is reversed. A downward force is exerted on the upwardly extending, central dome portion 28 of the cover 19, raising the peripheral flange portion 22 of the cover 19 as illustrated in phantom by FIG. 1. The raised portion 22 provides access to the lugs 17 on the metering cup for rotation thereof (as for example, by an appropriate tool), thereby causing the inner bait tube to rotate relative to the outer housing along thread 6 in a direction which disengages or uncouples the inner tube from the outer housing. The outer housing remains fixedly implanted in the terrain as a result of the outwardly extending radial elements 5. The inner tube is now removed from the outer tube, the metering cup is disengaged from the inner tube, and the bait material within the inner tube may be inspected for termite activity. The bait material may be replaced before the inner tube is reinstalled within the outer housing. Since the reinstallation procedure requires rotation of the inner housing relative to the outer housing a maximum angular distance along the lead thread 6, the openings 8 defined in the sidewall of the inner housing will be automatically re-aligned with the openings 2 defined in the sidewall of the outer housing to re-establish the passageways 4, merely by rotating the inner bait tube.

Other modifications within the scope of the present invention will become apparent to those skilled in the art. For example, although the inner and outer housings are illustrated as being tubular in configuration and each define a pointed bottom end surface, other configurations of the inner and outer tube can also be employed in the practice of the present invention. Additionally, although the openings in the inner and outer tubes have been illustrated as slots having a generally rectangular configuration, other configurations of the openings can be employed in the practice of the present invention. Preferably, the inner and outer housings and the metering cup, are formed from conventional, lightweight durable material, as for example, suitable plastics. The removable top cover is likewise formed from a durable, flexible material.

The description of the best modes for carrying out the invention discussed herein is intended to be illustrative only, and not restrictive of the scope of the invention, that scope being defined by the following claims and all equivalents thereto.

I claim:

1. A termiticide bait tube device for detecting and controlling termite activity, said device comprising:
   an outer housing adapted to be fixedly implanted in ground,
   an inner housing removably receivable within said outer housing,
   means for releasably coupling said inner housing to said outer housing, said means for releasably coupling said inner and outer housings including means for rotating said inner housing relative to said outer housing through a predetermined maximum angular range,
   said inner housing defining at least one opening therein, and said outer housing defining at least one opening therein,
   wherein said means for rotating said inner housing relative to said outer housing is operatively associated with said inner and outer housings such that relative rotation through said maximum angular range in a predetermined direction results in substantial alignment of said at least one opening in said inner housing with said at least one opening in said outer housing.

2. The device as claimed in claim 1 wherein said means for rotating said inner housing relative to said outer housing comprises threading engagement of said inner and outer housings.

3. The device as claimed in claim 2 wherein said means for rotating consists of single lead thread defined on a portion of said rotatable inner housing for threadably coupling said inner housing to said outer housing for providing said rotation of said inner housing relative to said outer housing along said single lead thread.

4. The device as claimed in claim 1 further including a raised peripheral portion defined around said at least one opening in said inner housing, said raised peripheral portion extending outwardly from the outer surface of said inner housing and abutting against the inner surface of said outer housing to define a continuous passageway connecting said at least one opening in said outer housing with said at least one opening in said inner housing.

5. The device as claimed in claim 1 wherein said outer housing defines a guide space, said guide space leading into and merging with said at least one opening defined in said outer housing, said guide space being wider than said opening defined in said outer housing.

6. A termiticide bait tube device for detecting and controlling termite activity, said device comprising:
   an outer housing adapted to be fixedly implanted in around,
   an inner housing removably receivable within said outer housing,
   means for releasably coupling said inner housing to said outer housing, said means for releasably coupling said inner and outer housings including means for rotating said inner housing relative to said outer housing through a predetermined maximum angular range, and
   at least one outwardly extending element from an outer surface of said outer housing for opposing rotation of said outer housing when said outer housing is fixedly implanted in ground and said inner housing is rotated relative to said outer housing, said outwardly extending element comprising at least one wedge shaped protuberance extending radially outwardly from said outer surface of said outer housing.

7. The device as claimed in claim 6 wherein said inner and outer housings are configured in a generally tubular shape.

8. The device as claimed in claim 7 wherein said outer housing has a forward end defining a point for driving said outer housing in ground.

9. The device as claimed in claim 8 wherein said inner and outer housings each have a forward end and each define at least one drainage opening at the respective forward ends of said inner and outer housing.

10. A termiticide bait tube device for detecting and controlling termite activity, said device comprising:
    an outer housing adapted to be fixedly implanted in ground,
    an inner housing removably receivable within said outer housing,
    means for releasably coupling said inner housing to said outer housing, said means for releasably coupling said inner and outer housings including means for rotating said inner housing relative to said outer housing through a predetermined maximum angular range, and
    a metering cup removably received in an upper end of said inner housing for releasing water to be mixed with bait material therebelow in said inner housing.

11. The device as claimed in claim 10 further including means on said metering cup and on said inner housing for releasably engaging said metering cup with said inner housing such that rotation of said metering cup relative to said outer housing results in rotation of said inner housing relative to said outer housing.

12. The device as claimed in claim 11 wherein said means for releasably engaging includes at least one lug on the outer surface of said metering cup and a complementary recess defined in said inner housing for removably receiving said lug.

13. A termiticide bait tube device for detecting and controlling termite activity, said device comprising:
    an outer housing adapted to be fixedly implanted in ground,
    an inner housing removably receivable within said outer housing,
    means for releasably coupling said inner housing to said outer housing, said means for releasably coupling said inner and outer housings including means for rotating said inner housing relative to said outer housing through a predetermined maximum angular range, and
    a metering cup removably received in said inner housing, a peripheral flange extending radially outwardly from said outer housing, and a flexible cover removably mounted atop said metering cup and said flange; said flexible cover defining a center portion adapted to releasably engage a rim portion of said metering cup, said flexible cover defining an outer peripheral portion adapted to be removably received in an outer rim portion of said flange extending outwardly from said outer housing.

14. The device as claimed in claim 13 wherein said flexible cover is designed such that a force applied to said center portion of said cover causes said peripheral portion of said cover to disengage from said outer rim portion of said flange.

15. A termiticide bait tube device for detecting and controlling termite activity, said device comprising:

an outer housing adapted to be fixedly implanted in ground, an inner housing removably received within said outer housing and rotatable relative to said outer housing for releasably coupling said inner housing to said outer housing, said inner housing defining at least a first opening therein and said outer housing defining at least a first opening therein, said openings in said inner and outer housing being arranged such that rotation of said inner housing relative to said outer housing through a maximum angular range in a predetermined direction automatically substantially aligns said at least one opening in said inner housing with said at least one opening in said outer housing for defining a passageway for providing access between the outside of said outer housing and the inside of said inner housing.

16. A method for detecting and controlling termite activity, said method comprising the steps of:

fixedly implanting an outer housing having at least one opening defined therein in ground, placing an inner housing having at least one opening defined therein within the outer housing, and rotating said inner housing a predetermined maximum angular distance relative to said outer housing along a threaded portion of said inner and outer housings for releasably coupling said inner housing to said outer housing and substantially aligning said at least one opening defined in said outer housing with said at least one opening defined in said inner housing.

* * * * *

UNITED STATES PATENT AND TRADEMARK OFFICE
CERTIFICATE OF CORRECTION

PATENT NO. : 6,003,266
DATED : December 21, 1999
INVENTOR(S) : Keith F. Woodruff It is certified that error appears in the above-identified patent and that said Letters Patent is hereby corrected as shown below:

Claim 3, Line 2 (Col. 7, Line 44):
Add - -a- - before "single".

Claim 6, Line 4 (Col. 7, Line 65):
Delete "around", and substitute - -ground- -.

Signed and Sealed this

Eleventh Day of July, 2000

Attest:

Attesting Officer

Q. TODD DICKINSON

Director of Patents and Trademarks